Patented May 14, 1935

2,001,176

UNITED STATES PATENT OFFICE 2,001,176

RUBBER COMPOSITION AND METHOD OF MAKING THE SAME

Frank H. Bergeim, Leonia, N. J., assignor to The Barrett Company, New York, N. Y., a corporation of New Jersey No Drawing. Application October 3, 1930, Serial No. 486,279

20 Claims. (Cl. 106—23)

My invention relates to new rubber compounds and methods of compounding the same using a new type or class of rubber compounding materials derived from low temperature tars.

Coal tar derivatives have been employed as rubber softeners and dispersing agents heretofore but these materials have heretofore been derived from coal tars produced by the destructive distillation of coal at high temperatures, that is, at temperatures of from 1000 to 1200° C. The distillates which are employed, as rubber softeners obtained from tars so produced, ordinarily contain large amounts of crystalline bodies, unless given special treatment to eliminate the same. These crystalline bodies are objectionable in rubber softeners, since they tend to cause "blooming" and discoloration of the rubber, thus giving the product a poor appearance.

The carbonization of coal at temperatures of from 400 to 600° C., and not exceeding 800° C., results in the formation of tars which differ materially from tars produced by the usual methods of carbonization at higher temperatures. Tars of this nature, i. e., tars produced by carbonization of coal at temperatures of from 400 to 600° C., and up to 800° C. are hereinafter referred to as "low temperature tars".

The nature and composition of the constituents of low temperature tars differ considerably from the constitutents of high temperature tars. Tars obtained by the carbonization of coal at the lower temperatures referred to above contain substantially no solid aromatic constituents and substantially no free carbon.

Among the objects of my invention are to provide a new type of rubber softening and dispersing agent, to provide a new method of compounding rubber and to provide new rubber compositions containing distillates derived from low temperature tars.

The softening and dispersing agents which may be employed in accordance with my invention are low temperature tar distillates having a boiling point range under atmospheric pressure about 200° C. The specific gravity of the distillates which I employ is not less than about 0.90 at 15.5° C. and preferably higher. These distillates are characterized by their very low content of crystalline bodies as compared with distillates obtained from high temperature tars ordinarily used as rubber softeners and dispersing agents.

As typical examples of the types of distillate which I prefer to employ, the following three fractions obtained by the distillation of low temperature tar under vacuum are cited:

(1) A fraction which may be termed a middle oil obtained by the distillation of low temperature tar under pressure substantially less than atmospheric pressure, having a boiling point range of 105° to 203° C. under a vacuum of 29 inches of mercury and having a specific gravity of about 0.90 to 0.97 at 15.5° C. The specific gravity of such fractions will vary with changes in distillation, temperature and pressure and may run as high as 1.00 at 15.5° C. Fractions of this character have been found to contain up to about 37% by volume of tar acids probably of complex composition. When the middle oil fraction is redistilled under atmospheric pressure, 95% of the fraction distills over at temperatures above 200° C. and up to 332° C. This fraction is therefore included wherever reference is made hereafter to distillates having a boiling point range under atmospheric pressure above about 200° C.

(2) A fraction which may be termed a heavy oil obtained by distillation of low temperature tars under vacuum having a boiling point range of 203° to 277° C. under a vacuum of 29 inches of mercury, and having a specific gravity of about 1.061 at 15.5° C. This fraction has been found to contain about 27% of tar acids.

(3) A resinous distillate obtained as a final fraction in the distillation of low temperature tars under vacuum. This product has a boiling point range of from 296° to 315° C. under 29 inches of mercury and a specific gravity of 1.132 at 15.5° C.

The boiling ranges recited herein refer throughout to thermometer-in-vapor temperatures.

Each of the foregoing distillates is almost entirely free from the crystalline deposits which are present in high temperature tar oils. The specific gravities of these distillates are also low as compared with the specific gravities of distillates from high temperature tars. Thus, whereas the middle oil fraction referred to above has a specific gravity of 0.90 to 0.97 or slightly higher at 15.5° C., a similar cut taken from coal tar produced by the usual high temperature methods has a specific gravity of about 1.050 at 15.5° C. The middle oil distillate, therefore, offers an economic advantage over the high temperature tar distillates by reason of its low specific gravity. The odor of the low temperature tar distillates is also considered preferable to that of coal tar distillates now in use.

Any of these distillates may be compounded with rubber to produce high grade rubber products. While I have found that any low temperature tar distillate boiling above about 200° C. under atmospheric pressure may be used with advantage as a rubber softener, I prefer to use that portion of the distillate which comes off as the last 25% by volume of the total distillate when low temperature tar is distilled under a high vacuum, for example, a vacuum corresponding to an absolute pressure of not over about 3 inches of mercury. This distillate is resinous in character and possesses the rubber-like characteristics of permitting stretching to a considerable distance without breaking. It blends well with rubber and imparts to the finished product highly desirable properties.

In some instances, the low temperature tar distillates may be treated to extract tar acids therefrom, but I have found that the presence of tar acids in the distillates is of material advantage in their use as rubber softeners and dispersing agents. The tar acids are probably of complex composition and appear to be responsible to a large degreee for the activating effects of the distillates and the good aging qualities imparted to the rubber with which they are compounded.

The amount of distillate employed in compounding rubber is varied with the nature of the product to be obtained and the amount and character of ingredients other than rubber introduced into the compound. These distillates are suitable for use in compounding rubber to be used in tire treads and tubes, rubber heels and soles, and various mechanical rubber goods. The amount of distillate used may constitute as much as 20% by weight of the compounded product. However, in general, the amount of the distillate employed is somewhat less than 20% and in typical cases wherein the rubber is to be used as tread stock for rubber tires about 5.25 parts by weight of the distillate are compounded wtih 100 parts by weight of rubber.

As typical formulæ using the various distillates described above in producing stock for tire treads, the following are cited, the proportions being given in parts by weight:

|  | Example I | Example II | Example III | Example IV |
|---|---|---|---|---|
| Smoked sheet rubber | 100.00 | 100.00 | 100.00 | 100.00 |
| Carbon black | 40.00 | 40.00 | 40.00 | 40.00 |
| Zinc oxide | 12.00 | 12.00 | 12.00 | 12.00 |
| Middle oil | 5.25 |  |  |  |
| Heavy oil |  | 5.25 |  |  |
| Resinous distillate |  |  | 5.25 | 6.50 |
| Stearic acid | 4.00 | 4.00 | 4.00 | 3.00 |
| Sulphur | 2.85 | 2.85 | 2.85 | 2.85 |
| Accelerator | 0.60 | 0.60 | 0.60 | 0.65 |
| Total | 164.70 | 164.70 | 164.70 | 167.00 |

Rubber compounds having the formulæ given above are in many respects superior to rubber products in which high grade rubber softeners derived from high temperature tars are used. They possess high resistance to abrasion or wear, high resistance to tear, and high tensile strength.

The low temperature tar distillates have been found to be efficient softening and dispersing agents for fillers such as carbon black, clays, whiting, etc. Milling tests of the distillates used in the proportions indicated show that they readily flux with the rubber and appear to be quite soluble in it. They soften uncured stocks, increasing their plasticity and imparting smooth calendering and tubing properties to the rubber. The dispersing properties of the distillates described above as determined by the resistance to wear of rubber compounds containing the same, measured on the Grasselli abrader, compare favorably with those of high grade rubber softeners obtained from high temperature tars. The low temperature tar distillates with the tar acids extracted also show dispersing properties equally as good as those of distillates obtained from high temperature tars.

Rubber compositions of the formulæ cited above containing the resinous distillate or the unextracted oils obtained from low temperature tars all show greater tensile strength than similar compounds containing high grade rubber softeners obtained from high temperature tars. The improvement in tensile strength and the percentage increase in elongation of the stock is particularly marked in the products containing the unextracted oils and all of the distillates produce rubber stocks which are not as stiff as those produced when using high temperature tar distillates as rubber softeners.

The rate of cure of rubber compositions containing the resinous distillate and the unextracted oils as determined by measuring the tensile strength of the composition after cures of progressively increased duration shows a marked increase in the case of the low temperature tar distillates. This is particularly true of the unextracted distillate oils of higher boiling point. In the latter case the optimum cure is reached 15 minutes earlier than with a similar composition containing a high grade softening agent obtained from high temperature tar. This property of the low temperature tar distillates gives evidence of the greater activating properties of my new rubber softeners. This fact has been further demonstrated by comparing a product having the formula of Example III, but substituting high temperature tar distillate for the resinous distillate, with the rubber composition given above in Example IV in which the activator (stearic acid) is 25% greater and the amount of resinous distillate and accelerator are but slightly higher. In the rubber composition of Example IV, the resinous distillate is found to continue to activate the accelerator to the same extent as the rubber softener from high temperature tar. This property of my new rubber softeners is of advantage in that the amount of curatives added to the composition may be reduced and the cost per pound of the final product decreased.

The tensile strength of rubber compounds containing the preferred softening agents described above have been tested before and after heat-aging at 70° C. for two weeks. From such tests, it is found that the compositions containing the resinous product age exceptionally well, giving evidence of anti-oxidant properties. The product containing the heavy oil distillate also ages better than similar products compounded with high grade rubber softeners consisting of distillate from high temperature tar.

In some cases the tar acids contained in the middle and heavy oil distillates were extracted prior to compounding with rubber. The products produced with the extracted oils were softer than similar products produced with high temperature tar distillate as the softening agent. The presence of tar acids in the above described middle and heavy oil distillates from low temperature tars have also been found to impart much greater tensile strength and activating properties to the rubber composition. Furthermore, the aging properties of the rubber compositions containing unextracted oils are greater than is the case with the oils from which the tar acids have been extracted. These properties of the unextracted oils give evidence of the distinct advantages of tar acids in improving the physical properties of the rubber compositions.

The amount and color of the "bloom" produced by adding excess sulfur to compounds containing the low temperature tar distillates is found to be much less objectionable than that resulting when a high temperature tar distillate is employed in the same manner. It is also found that the color imparted to the rubber is not so pronounced when the low temperature tar distillates are employed. A product containing 5.25 parts of the resinuous distillate to 100 parts of rubber and with excess sulfur showed no discoloration of the sulfur bloom whatever, even after being held at room temperature for ten weeks. Products containing up to 15 parts by weight of the resinous low temperature tar distillate to 100 parts of rubber and with 10 parts sulfur showed distinct superiority over similar compounds containing only 10 parts by weight of resinous rubber softeners derived from high temperature tars. The "bloom" produced in the rubber article containing the high temperature tar product was rusty brown in color whereas the low temperature tar distillate merely gave a slight greenish tinge to the sulfur "bloom". After ten weeks the discoloration of the "bloom" produced in the product containing the resinous low temperature tar distillate was still much less objectionable.

The low temperature tar distillates may be incorporated with the rubber and other ingredients in any usual or preferred manner and in a wide range of proportions without departing from the invention. While I have described preferred low temperature tar distillates which may be used in accordance with my invention and have cited specific examples of rubber compositions containing the distillates described, these examples have been given as illustrative of my invention and without intending to limit the invention thereby.

I claim:

1. A composition of matter comprising rubber and a coal tar distillate derived from low temperature tar, said distillates boiling under atmospheric pressure at temperatures above about 200° C.

2. A composition of matter comprising rubber and a coal tar distillate derived from low temperature tar and having a specific gravity of not less than about 0.90 at 15.5° C.

3. A composition of matter comprising rubber and a resinous distillate obtained from low temperature tar.

4. A composition of matter comprising rubber and a resinous coal tar distillate derived from low temperature tar having a specific gravity of about 1.132 at 15.5° C.

5. A composition of matter comprising rubber and a softening agent comprising a part or all of the last 25% of distillate coming off when low temperature tar is distilled.

6. A composition of matter comprising rubber and not over about 20% of coal tar distillate derived from low temperature tar having a boiling point range under atmospheric pressure above about 200° C.

7. A composition of matter comprising rubber and not over about 20% of coal tar distillate having a specific gravity of not less than about 0.90 at 15.5° C. derived by the distillation of low temperature tar.

8. A composition of matter comprising 100 parts by weight of rubber and about 5.25 parts by weight of a coal tar distillate having a specific gravity of at least 0.90 at 15.5° C., derived from low temperature tar.

9. A composition of matter comprising rubber and a distillate derived by the distillation of low temperature tar under a high vacuum having a specific gravity of not less than about 0.90 at 15.5° C.

10. A composition of matter comprising 100 parts by weight of rubber and about 5.25 parts by weight of a resinous coal tar distillate obtained by the distillation of low temperature tar under a high vacuum, said distillate boiling at a temperature above about 296° C. under a vacuum of 29 inches of mercury.

11. A composition of matter comprising rubber and a softening agent comprising a part or all of the last 25% of distillate coming off when low temperature tar is distilled under a high vacuum.

12. A composition of matter comprising rubber and a coal tar distillate derived from low temperature tar containing substantial amounts of tar acids.

13. A composition of matter comprising rubber and a coal tar distillate obtained by the distillation of low temperature tar, said distillate having a specific gravity of not less than about 0.90 at 15.5° C. and containing up to about 37% of tar acids.

14. The method of compounding rubber which comprises mixing rubber with a coal tar distillate derived from low temperature tar having a boiling point range under atmospheric pressure above about 200° C.

15. The method of compounding rubber which comprises mixing rubber with a coal tar distillate derived from low temperature tar having a specific gravity of not less than about 0.90 at 15.5° C.

16. The method of compounding rubber which comprises mixing rubber with a coal tar distillate derived from low temperature tar by distillation under a high vacuum having a specific gravity of not less than about 0.90 at 15.5° C.

17. The method of compounding rubber which comprises mixing rubber with a resinous distillate obtained from low temperature tar.

18. The method of compounding rubber which comprises mixing rubber with not over 20% of its weight of a coal tar distillate derived from low temperature tar having a specific gravity of not less than about 0.90 at 15.5° C.

19. The method of compounding rubber which comprises mixing rubber with not over 20% of its weight of a coal tar distillate derived from low temperature tar containing up to about 37% of tar acids.

20. The method of compounding rubber which comprises mixing 100 parts by weight of rubber with about 5.25 parts by weight of a coal tar distillate derived from low temperature tar having a boiling point range above about 200° C. under atmospheric pressure.

FRANK H. BERGEIM.

CERTIFICATE OF CORRECTION.

Patent No. 2,001,176. May 14, 1935.

FRANK H. BERGEIM.

It is hereby certified that error appears in the printed specification of the above numbered patent requiring correction as follows: Page 1, first column, line 45, before "about" insert the word above; and that the said Letters Patent should be read with this correction therein that the same may conform to the record of the case in the Patent Office.

Signed and sealed this 2nd day of July, A. D. 1935.

Leslie Frazer (Seal) Acting Commissioner of Patents.